March 14, 1950  E. B. STEAD  2,500,907
MEANS FOR MAKING GRAPHIC RECORDS
Filed Feb. 15, 1946  2 Sheets-Sheet 1

Inventor:
EDWARD BRIAN STEAD

By Richardson, David and Norden
Attorneys

March 14, 1950     E. B. STEAD     2,500,907
MEANS FOR MAKING GRAPHIC RECORDS
Filed Feb. 15, 1946     2 Sheets-Sheet 2
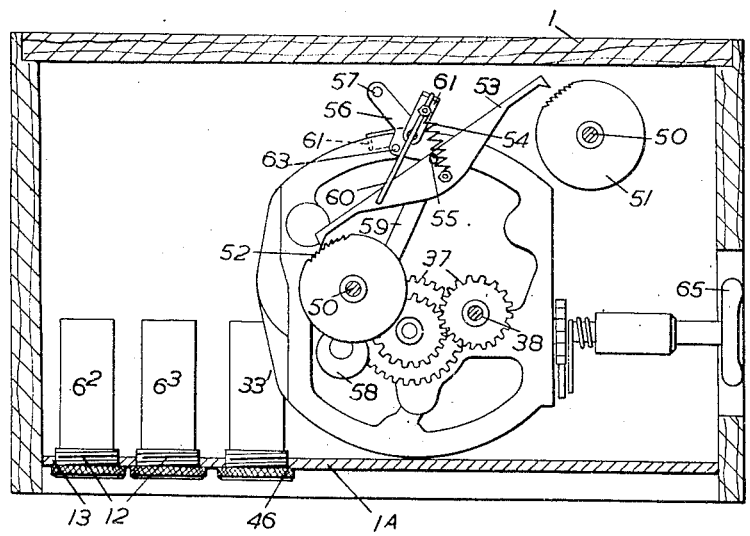
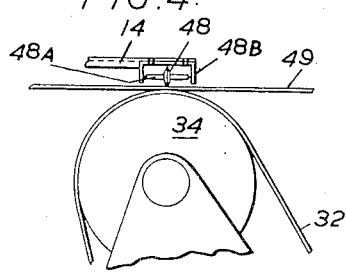
Inventor:
EDWARD BRIAN STEAD
By Richardson, David and Nordon
Attorneys Patented Mar. 14, 1950

2,500,907

UNITED STATES PATENT OFFICE 2,500,907

MEANS FOR MAKING GRAPHIC RECORDS

Edward Brian Stead, Bearsden, Scotland, assignor to Dobbie McInnes Limited, Glasgow, Scotland Application February 15, 1946, Serial No. 647,779
In Great Britain September 6, 1943

4 Claims. (Cl. 346—139)

This invention relates to a method of and means for marking a record in recording instruments, of the type in which a movable marker causes a graphic record of its movement to be made on a record sheet or other record surface. The invention is applicable, for example, to recording accelerometers, or to axle press recorders.

One of the chief objectives of the invention is to provide means for marking a record in which, there is a minimum of friction and which closely follows the variations of the quantity involved. A further object is to provide marking means which is of simple construction. A still further object is to provide marking means in which a fine clear record line with minimum of distortion is provided.

In accordance with the invention I provide means for making a graphic record of the variation of a quantity, comprising a record sheet adapted to be marked with the record, a mechanical marker adapted to move, when influenced by the variation in said quantity, in the plane of said record sheet and continuously urged toward said sheet, and a marking ribbon interposed between said marker and said sheet and adapted to transmit pressure of said marker to said sheet as a record thereon.

In further accordance with the invention I provide means for making a graphic record of the variation of a quantity, comprising a record sheet adapted to be marked with the record, a mechanical marker adapted to move, when influenced by the variation in said quantity, in the plane of said record sheet and continuously urged toward said sheet, a marking roller borne in anti-friction bearings on said marker arm, and a marking ribbon interposed between said marking roller and said sheet and adapted to transmit pressure of said roller to said sheet as a record thereon.

Preferably the marker arm carries a roller having a peripheral marking edge, the ribbon being located between the roller and the record sheet.

To ensure satisfactory marking for a long period of time the ribbon-supporting means may incorporate mechanism which causes the ribbon to progress across the path of movement of the marker arm.

As a result of the invention there is a minimum of friction in the marking means, thus minimizing distortion in the record, and a clear, fine record line is obtained.

I will now describe an embodiment of the invention, simply by way of an example, as applied to an accelerometer being an instrument for use in recording, for example the results of acceleration, brake and spring-suspension tests of vehicles.

In the drawings:

Fig. 3 is section on the line 3—3 of Fig. 1.

Figure 4 is a view to an enlarged scale of the marking means in accordance with the invention incorporated in the accelerometer.

Figure 1:
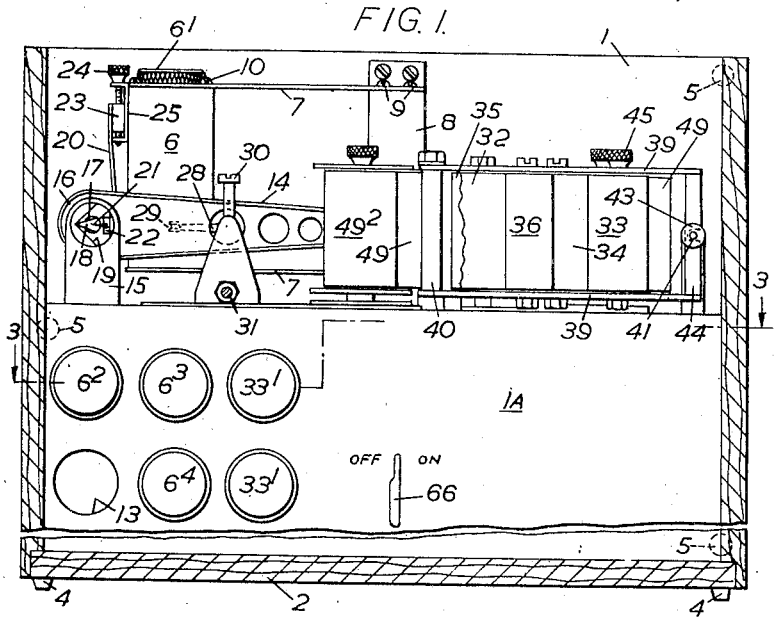
Figure 1 is an elevation of the accelerometer.

The accelerometer is also described in my British Patent, Specification Number 587,272.

Referring to the drawings, the frame of the instrument includes a rectangular case 1 which is adapted to stand on its base 2 when used for measuring vertical accelerations and to lie on its back 3 when used for measuring horizontal accelerations. For each setting the case has a three-point support, so that the instrument will rest steadily even on uneven surfaces. The three supports are constituted by pads 4 on the base 2 and pads 5 on the back 3. In the following description, for simplicity, the frame will be regarded as standing upright and as being stationary relatively to the vehicle.

The mass includes a vertical cylinder 6 supported by two parallel springs 7. These springs are blades which tend to extend horizontally from a bracket 8 in the case to which bracket ends of the springs are secured by screws 9. The springs are fixed at their "free" end by screws 10 to the top and bottom ends of the prism. The arrangement is such that the prism can oscillate endwise in a vertical plane against the centralising action of the springs.

The accelerometer is intended to be capable of testing several ranges of accelerations, or other rates of change, and in order to give effect to this intention the cylinder 6 is formed with a central hole 11 into which can be fixed any selected one of a set of interchangeable weights, differing from one another in mass, respectively denoted $6^1$, $6^2$, $6^3$ and $6^4$. Each weight has a milled head, below which is a screw-threaded neck 12 adapted to screw into either the central hole in the cylinder or one of four holes 13 in a lower portion of the case constituting a housing 1A. Thus, the mass as a whole comprises the cylinder 6 together with the weight $6^1$ or $6^2$ or $6^3$ or $6^4$ for the time being fixed on the cylinder.

The motion-magnifying arm is a lever 14 fulcrumed in brackets 15 on a base-plate in the case, said baseplate being the roof of the housing 1A. The lever arm 14 is connected as hereinafter explained to the mass at a point spaced from the axis of the fulcrum. In order that the arm will have low inertia about said axis and adequate stiffness it is composed of a light alloy and is made of triangulated form and of lattice construction.

Figure 2:
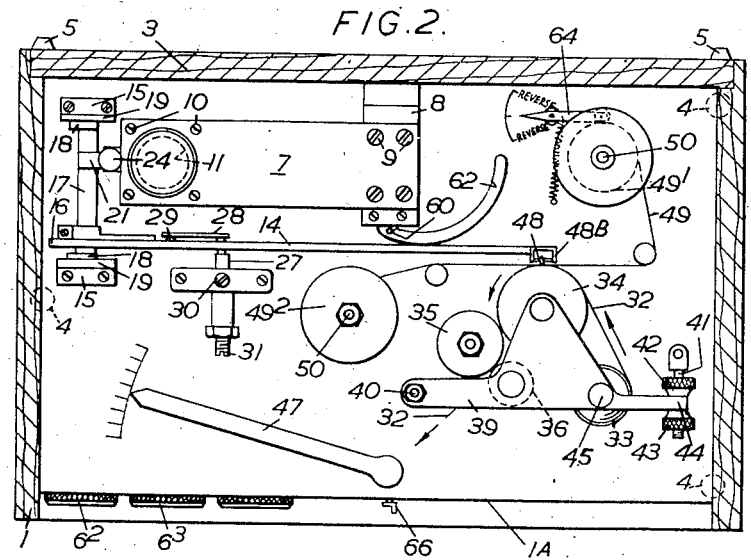
Fig. 2 is a plan.

It is essential that solid friction must be minimized in regard to the moving parts. To this end, the fulcrum and the connection to the mass incorporate knife-edge bearings. The boss 16 of the arm is secured to a horizontal fulcrum shaft 17 the end of which have knife-edges 18 that bear in V-bearings 19 in said bracket 15. Said connection comprises a substantially vertical blade spring 20 the top end of which is anchored to the mass and the bottom end of which has a V-bearing 22 in which bears a knife edge 21 on the fulcrum shaft 17. The spring 20 is stressed to maintain the three V-bearings 19, 19 and 22 and the knife-edges 18, 18 and 21 in proper interengagement. The axis of the fulcrum shaft is represented by the aligned edges of the knives 18 and the point of connection between the arm 14 and the mass has its locus on the edge of the knife 21; and said point is spaced from said axis, as Figs. 1 and 2 show. The anchorage between the spring and the mass incorporates a screw-adjustment device by which the zero-setting of the arm can be adjusted. In the example, said device comprises a nut 23 fixed to the top of the blade spring 20, and a screw 24 that is turnable but not movable endwise in a bracket 25 on the cylinder 6 and that is threaded through the nut. The arrangement is such that the arm is movable about its fulcrum in a vertical plane parallel to the plane in which the mass oscillates.

The accelerometer has a damping device which is connected to the lever arm 14. In the example, the damping device includes an oscillatory vane or paddle (not shown) which is a clearance fit in a housing that contains damping fluid, for instance light engine oil. The spindle or axle of the vane is denoted by 27 in Fig. 2, in which the said spindle is shown to have an arm 28 connected at 29 to the arm 14, the arrangement being such that the vane is oscillated in unison with the oscillations of the mass. The housing has a by-pass and also a combined filling plug and air bleed 30. As it is desirable that the damping force shall be adjustable, and the adjustment screw 31 is provided to control the by-pass. In the drawings, only the exterior of the damping device is shown in the interests of simplicity, the construction of such devices being well known to instrument makers.

The free end of the motion-magnifying arm 14 in the example, serves as a record marker. The record is marked on a travelling band of paper 32, which is arranged to pass from a reservoir roller or spool 33 round an impression roller 34 and through the nip between a guide roller 36 and a rubber-covered driving roller 35. All the rollers have vertical axes. The roller 35 is driven in the example through gearing 37 in the housing 1A, the spindle 38 of the driving roller being shown with said gearing in Fig. 3. It is desirable that a fresh spool of paper shall be readily attached in place whenever a spool in use is exhausted. Therefore in the example, the rollers 33, 34 and 36 are all mounted in a pivotal frame comprising upper and lower members 39 in which said rollers are journalled. The frame is pivoted at one end to a post 40 and is attachable at its other end to a swivel-mounted screw 41 between clamping nuts 42, 43 thereon, the frame having a forked extension 44 that is engageable with the screw 41. In order to remove a spool, the nut 43 is unscrewed and the frame 39 is swung outwards. The spindle 45 of the spool is unscrewed and withdrawn, a fresh spool is inserted and the spindle 45 is replaced. Thereafter a short length of the paper band 32 is unwound and is led round the impression roller 34 and past the guide roller 36 after which the frame 39 is swung inwards, the band being nipped between the roller 35 and the roller 36. Finally the nut 43 is replaced to lock the frame in its working position. The nut 42 serves as an adjustable abutment, whose setting determines the tightness of the nip between the guide roller 36 and the driving roller 35.

The housing 1A has holes 46 beside the weight holes 13 to hold spools 33[1] in readiness for use.

The gearing 37 that drives the driving-roller spindle 38 is driven by a spring motor (not shown) in the housing 1A of the kind commonly used as gramophone motors, the driving speed being capable of adjustment by a control lever 47 and being maintained by a governor (not shown). A speed from about .25 to 1 inch per second is found suitable.

The record-marking means includes a small light weight roller 48 which, together with associated parts, is shown best in Fig. 4. The roller 48 has a spindle 48A with pointed ends turning in bearings on a bracket 48B secured to the free end of the lever arm 14. The roller 48 is formed with a peripheral edge which presses lightly towards the paper-supporting surface of the impression roller 34. By journalling the roller as shown by pointed pivot bearings, an anti-friction arrangement is provided and solid friction is minimised. A broad travelling inked ribbon 49 is led between the impression roller and the paper 32 in a direction at right angles to the impression roller axis. Throughout the full range of oscillation of the motion-magnifying arm 14 the marking roller 48 bears upon the ribbon and causes a line to be marked on the paper. The ribbon is driven slowly from one of two ribbon spools 49[1], 49[2] to the other so as to traverse the zone in which the marking roller works, and the drive is preferably reversible. One form of reversible mechanism embodied in the example will now be described, namely; The ribbon spools are respectively carried by rotatable spindles 50 each of which is turned stepwise by one of two ratchet wheels 51, 52, the arrangement being such that the initially empty spool is driven to draw ribbon from the initially full spool. The ratchet wheels alternately cooperate with a double pawl 53, which is pulled by a spring 54 against one or the other of the ratchet wheels. The pawl is pivotally mounted at 55 on a pawl-carrier 56 which is pivotally mounted on a post 57 standing on the base of the housing 1A. The carrier 56 is oscillated by an eccentric 58 acting through an eccentric-rod 59 pivotally connected at 55 to the pawl-carrier the eccentric being driven by the gearing 37. The direction of action of the spring 54 is under the control of a finger lever 60 which is rigidly secured to a tumbler 61 on the pawl carrier and which extends through an arcuate slot 62 in the roof of the housing 1A. One end of the spring 54 is connected to the tumbler 61, which rests in one or other of two angular settings against stop pins 63 on the pawl-carrier one of which pins is shown in Fig. 3. The tumbler is shown in one setting in full lines and in the other setting in dot-dash lines. The arrangement is such that the user of the instrument can change the direction in which the tape is driven by turning the lever 60 from one end of the slot 62 to the other, that action having the effect of throwing the tumbler 61 from one setting to the other with the result that the pawl is pivoted from the one ratchet-wheel to the other.

In order that there will be an indication of the condition that the supply spool is nearly exhausted and that therefore reversal is necessary, a suitable indicator is provided. In the example, the indicator is a small lever 64 one end of which co-operates with an indicator scale and the other end of which has a roller that bears against the wound ribbon on the adjacent spool.

In order to operate the accelerometer, the motor is wound up by means of a winding handle such as indicated at 65, Fig. 3, and the motor is started by means of the usual starting and stopping brake lever 66, Figs. 1 and 2. Thus, the band of paper 32 is driven past the marker 48 at constant speed by the driving roller 35. Assuming that the accelerometer is borne by a body undergoing acceleration for which the mass is suitable to the extent that the mass oscillates relatively to the instrument frame in sympathy with such acceleration, the lever arm 14 oscillates in unison with the mass and the marker 48 traces a magnified wave form record of the oscillation on the travelling paper band.

Meanwhile the ribbon 49 slowly traverses the marking zone.

In regard to the purposes for which the instrument according to the example is designed, "g" (the acceleration due to gravity) may be regarded as the basic or datum acceleration. With a mass giving a natural frequency of, say 12 per second the record or deflection is found to be to the scale $g=22.5$ mm. With a mass giving a natural frequency of 17 per second, the record is found to be to the scale $g=10.5$ mm. For instance, a mass giving a larger scale than these but a lower natural frequency is useful for recording accelerations of heavy road vehicles as these accelerations are usually of a low value such as $g/10$.

I claim:

1. In combination, in an instrument for making a continuous graphic record of the variation of a quantity, a rigid mechanical marker arm pivotally movable under the influence of the variation in said quantity, means for supporting a record strip in position for receiving a graphic record of the movement thereof, a marking roller rigidly mounted on said arm, a peripheral marking edge on said roller pressing lightly on said record strip, pointed pivot bearings journalling said roller in said arm and having their axis in a plane containing the longitudinal axis of the arm so that pivoting of the arm causes rolling of the roller, means for effecting travel of the record strip at a constant speed in the direction of the roller axis, and means for supporting a marking strip between said marking edge and said record strip so that the relative movements of the arm and record strip are transmitted to the latter as a continuous line record, including means for effecting travel of said marking strip in the direction of the roller axis.

2. A continuous graphic recording means comprising an arm mounted on a pivotal axis and adapted to oscillate thereabout proportionally responsive to a varying quantity, a marking disc carried by said arm wherein said disc is freely rotatable about an axis substantially normal to the pivotal axis of said arm, a marking ribbon having a side engaging the periphery of said disc, means for constantly actuating said marking ribbon in the plane of oscillatory motion of said disc and with respect thereto, a record strip engaging the other side of said marking ribbon and independent means for effecting motion thereof with respect to said marking disc.

3. A continuous graphic recording means comprising an arm mounted on a pivotal axis and adapted to oscillate thereabout proportionally responsive to a varying quantity, a marking member carried by said arm, a marking ribbon having a side engaging said marking member and means for continuously moving said ribbon in a direction normal to the pivotal axis of said arm, a record strip engaging the other side of said ribbon and means for continually moving said record strip in the same direction.

4. In combination, in an instrument for making a continuous graphic record of the variation of a quantity, a rigid mechanical marker arm pivotally movable under the influence of the variation in said quantity, means for supporting a record strip in position for receiving a graphic record of the movement thereof, a marking roller rigidly mounted on said arm, a peripheral marking edge on said roller pressing lightly on said record strip, bearings journalling said roller in said arm and having their axis in a plane containing the longitudinal axis of the arm so that pivoting of the arm causes rolling of the roller, means for effecting travel of the record strip at a constant speed in the direction of the roller axis, and means for supporting a marking strip between said marking edge and said record strip so that the relative movements of the arm and record strip are transmitted to the latter as a continuous line record, including means for effecting travel of said marking strip in the direction of the roller axis.

EDWARD BRIAN STEAD.

REFERENCES CITED

The following references are of record in the file of this patent:

UNITED STATES PATENTS

| Number | Name | Date |
|---|---|---|
| 1,151,120 | Nieman | Aug. 24, 1915 |
| 1,247,514 | Dudley | Nov. 20, 1917 |
| 1,598,739 | Mettler | Sept. 7, 1926 |
| 2,393,069 | Rushing et al. | Jan. 15, 1946 |
| 2,397,562 | Potter | Apr. 2, 1946 |